United States Patent [19]

Melling et al.

[11] 4,124,733
[45] Nov. 7, 1978

[54] LAMINATED GLASS UNITS

[75] Inventors: Richard Melling, Birmingham; Arthur J. Nobbs, Alvechurch; Andrew Leff, Skelmersdale, all of England

[73] Assignee: Pilkington Brothers Limited, St. Helens, England

[21] Appl. No.: 793,299

[22] Filed: May 3, 1977

Related U.S. Application Data

[63] Continuation of Ser. No. 547,653, Feb. 6, 1975, abandoned, which is a continuation of Ser. No. 221,421, Jan. 27, 1972, abandoned, and a continuation-in-part of Ser. No. 872,370, Oct. 29, 1969, abandoned.

[30] Foreign Application Priority Data

Oct. 31, 1968 [GB] United Kingdom ............... 51746/68

[51] Int. Cl.$^2$ ..................... B32B 7/02; B32B 17/00; B32B 27/42
[52] U.S. Cl. ................................. 428/212; 156/106; 428/215; 428/337; 428/410; 428/437
[58] Field of Search .................. 156/106; 65/114, 116; 52/203; 428/426, 437, 334, 335, 336, 337, 339, 212, 215, 216, 217, 410

[56] References Cited

U.S. PATENT DOCUMENTS

| | | | |
|---|---|---|---|
| 2,374,040 | 4/1945 | Ryan | 156/106 |
| 2,827,739 | 3/1958 | Atkeson | 156/102 |
| 2,946,711 | 7/1960 | Brogaw, et al. | 161/199 |
| 3,243,335 | 3/1966 | Faile | 161/1 |
| 3,282,772 | 11/1966 | Davis | 156/106 |
| 3,287,201 | 11/1966 | Chisholm et al. | 161/199 |
| 3,396,075 | 8/1968 | Morris | 161/199 |
| 3,414,464 | 12/1968 | Lang | 161/1 |
| 3,427,770 | 2/1969 | Kunert et al. | 52/203 |
| 3,434,915 | 3/1969 | Garrison | 161/199 |
| 3,505,160 | 4/1970 | Michaels et al. | 161/199 |
| 3,574,045 | 4/1971 | Mould | 161/164 |
| 3,592,726 | 7/1971 | Blizard | 161/199 |
| 3,653,866 | 4/1972 | Wartenberg | 65/116 |
| 3,734,815 | 5/1973 | Schorel | 161/165 |
| 3,778,338 | 12/1973 | Murphy | 428/410 |
| 4,075,381 | 2/1978 | Furukawa et al. | 428/437 |

Primary Examiner—William R. Dixon, Jr.
Attorney, Agent, or Firm—Burns, Doane, Swecker & Mathis

[57] ABSTRACT

A laminated glass windscreen comprises two sheets of glass laminated together with a layer of transparent plastics material. The inner sheet of the windscreen is of thickness in the range 0.5 mm to 3 mm and is toughened to a degree such that the central tensile stress in the glass is from 380 kg/cm$^2$ to 1120 kg/cm$^2$. The outer sheet may be an untoughened sheet of thickness 0.5 mm to 3.5 mm or a toughened sheet of thickness 0.5 mm to 3 mm and whose central tensile stress does not exceed 560 kg/cm$^2$.

2 Claims, No Drawings

LAMINATED GLASS UNITS

CROSS REFERENCE TO RELATED APPLICATIONS

This is a continuation of application Ser. No. 547,653, filed Feb. 6, 1975, now abandoned which application is a continuation of co-pending application Ser. No. 221,421 filed Jan. 27, 1972 now abandoned and is a continuation-in-part of application Ser. No. 872,370 filed Oct. 29, 1969, now abandoned, through the co-pendency of applications Ser. Nos. 221,421 and 872,370 both now abandoned.

BACKGROUND OF THE INVENTION

This invention relates to laminated glass windscreens embodying at least one thin sheet of toughened glass.

It is a main object of the present invention to provide an improved laminated glass windscreen having dual fracture characteristics, which windscreen fractures into large particles when struck from the outside by a sharp object, e.g. a flying stone, and shatters with a powdery fragmentation if struck from the inside by a large softer object such as a human head.

SUMMARY

A laminated glass windscreen according to the invention is formed of two sheets of glass each between 0.5 mm and 3 mm thick, laminated together with a flexible, penetration-resistant layer of transparent plastics material of a thickness of the order of 0.75 mm. The inner glass sheet is a thermally toughened glass sheet having a central tensile stress within the range of 380 kg/cm$^2$ to 1120 kg/cm$^2$, and preferably within the range 420 kg/cm$^2$ to 1120 kg/cm$^2$. The outer glass sheet is an untoughened glass sheet whose central tensile stress is at most 70 kg/cm$^2$, or is a thermally toughened glass sheet having a central tensile stress in the range 380 kg/cm$^2$ to 560 kg/cm$^2$ and preferably within the range 420 kg/cm$^2$ to 560 kg/cm$^2$. The untoughened sheet may be up to 3.5 mm thick.

DESCRIPTION OF THE PREFERRED EMBODIMENTS

A sheet of glass, for example 2 mm thick, is toughened by the method described in U.S. patent application Ser. No. 155,234, filed June 26, 1971, now U.S. Pat. No. 3,890,128 which is a continuation of application Ser. No. 802,151, filed Feb. 25, 1969 abandoned.

The glass sheet is suspended by tongs in a vertical furnace and is uniformly heated to a temperature in the range 600° C. to 750° C. Preferably this initial temperature is in the range 640° C. to 690° C.

When the thin glass sheet has attained its initial temperature uniformly throughout its thickness it is lowered rapidly by the tong suspension at a controlled velocity between fixed quenching boxes which direct quenching air at room temperature uniformly over both faces of the descending glass sheet. Alternatively, prior to its descent between the quenching boxes, the hot glass sheet may be bent to a desired shape between bending dies positioned just beneath the furnace.

The initial temperature of the glass sheet and its velocity between the quenching boxes determine the degree of preliminary toughening of the glass. Each part of the glass may be exposed to the quenching air during the first part of its descent for a time of for example 0.7 secs. to 5 secs., and as the glass passes from this preliminary quenching stage its surface temperature has usually fallen by about 60° C. to 80° C.

The downward travel of the partially quenched glass continues from between the quenching boxes to a chilling stage where the glass is lowered into a tank of a liquid chilling medium having a heat transfer coefficient in the range from 0.0035 to 0.06 cal. cm$^{-2}$. ° C.$^{-1}$. sec$^{-1}$, for example a lubricating oil, or vegetable oil, or a molten metal such as molten tin or a molten tin alloy which liquid is maintained at a temperature of the order 45° C. to 100° C.

The descending, partially toughened, but still hot glass is severely chilled as it becomes immersed in the liquid chilling medium and the glass is maintained immersed until it reaches the temperature of the chilling medium, and is thereafter removed from the tank and cleaned.

The degree of toughening of the thin glass so produced is dependent on the operating conditions, that is the initial temperature of the glass, the rate of quenching in the preliminary quenching stage, and the temperature of the liquid chilling medium. The resulting toughened thin glass sheet, whose flatness is assured, has induced central tensile stress in the range 380 kg/cm$^2$ to 1120 kg/cm$^2$ and preferably in the range 420 kg/cm$^2$ to 1120 kg/cm$^2$, and in the range 420 kg/cm$^2$ to 700 kg/cm$^2$ for 2 mm glass, while the ratio of surface compressive stress to central tensile stress in the thin toughened glass is of the order of 2:1.

For example, as described in the above mentioned patent application glass 2 mm thick at an initial temperature of 680° C. is first subjected to a surface cooling to set up a centre-to-surface temperature difference of about 60° C., and thereafter the glass is immersed in a chilling oil, Castrol Iloquench 3, at about 45° C. The glass had an ultimate tensile strength of 1900 kg/cm$^2$ to 1950 kg/cm$^2$ and a central tensile stress of 630 kg/cm$^2$.

By varying the operating parameters the resulting stresses in the glass to be laminated were varied as summarised in the following table, each of the glass sheets being 2 mm thick.

| Glass | Ultimate Tensile Strength | Central Tensile Stress |
|---|---|---|
| 1 | 1900 kg/cm$^2$ to 1950 kg/cm$^2$ | 630 kg/cm$^2$ |
| 2 | 1900 kg/cm$^2$ | 420 kg/cm$^2$ |
| 3 | 2100 kg/cm$^2$ | 700 kg/cm$^2$ |
| 4 | 1820 kg/cm$^2$ | 560 kg/cm$^2$ |
| 5 | 1820 kg/cm$^2$ | 560 kg/cm$^2$ |

Glass 0.8 mm thick was also toughened for use in making a laminate, and by varying the operating parameters was suitably produced with an ultimate tensile strength in the range 1600 kg/cm$^2$ to 1700 kg/cm$^2$ and a central tensile stress of 500 kg/cm$^2$ to 560 kg/cm$^2$.

One thin sheet of toughened glass which is to serve as the inner sheet of the windscreen, is then laminated, using coventional techniques and an adhering penetration resistant interlayer of polyvinyl butyral 0.75 mm thick, which is to serve as the outer sheet of the windscreen. This outer sheet may be a sheet of similarly toughened glass having a central tensile stress of at most 560 kg/cm$^2$.

As is well known it is desirable that there be some residual stress in untoughened or annealed glass sheets, for example corresponding to a residual central tensile stress of the order of 30 to 40 kg/cm$^2$. It has been found preferable that an untoughened glass sheet embodied as the outer glass sheet in a laminated windscreen shall not have a residual central tensile stress greater than 70 kg/cm$^2$.

A laminated windscreen embodying two thin sheets of glass as described above is not penetrated by a sharp object, e.g. a flying stone, despite the thinness of the glass. Rather, the fracture produced in the outer sheet by a sharp object is a star fracture of relatively large particles and the inner sheet is not fractured so that visibility through the windscreen is not substantially impaired.

If however the inner toughened sheet is struck by a large softer object such as a human head, the bending of the windscreen by that impact induces stress in the inner or both toughened glass sheets which is additive to the central tensile stress already set into the glass by the toughening operation and causes powdery fragmentation of the glass permitting elastic deformation of the windscreen thereby considerably reducing the possibility of brain damage.

By varying the control factors in the toughening operation so the central tensile stress in the thin glass is accurately regulated, within the specified range, the outer toughened glass of a laminated windscreen may have a degree of toughening which is more compatible with maintenance of visibility when struck by a flying object, that is a central tensile stress in the range 380 kg/cm$^2$ to 560 kg/cm$^2$, e.g. 420 kg/cm$^2$ whereas the inner glass sheet may be toughened to a higher degree in the range of central tensile stress from 380 kg/cm$^2$ to 1120 kg/cm$^2$, preferably in the range 420 kg/cm$^2$ to 700 kg/cm$^2$, commensurate with rapid powdery fragmentation when struck by a human head, and commensurate with the simultaneous enhanced deformation of the bonding layer and the stressing of the outer, lesser toughened sheet to an extent ensuring rapid powdery fragmentation of the outer sheet as well.

In some further examples of laminated windscreens according to the invention, set out below, the inner and outer glass sheets are both of thickness within the range 0.5 mm to 3 mm and are each a thermally toughened glass sheet having a central tensile stress in the range 380 kg/cm$^2$ to 560 kg/cm$^2$.

Two identical sheets of glass 2 mm thick were heated, bent to desired identical curvature and thermally toughened in the way described above to produce in both sheets a central tensile stress of about 380 kg/cm$^2$. The toughened sheets were then laminated together in conventional manner with an interlayer of polyvinyl butyral 0.75 mm thick to produce a curved laminated windscreen which was then tested.

The windscreen was then supported in a frame in a vertical disposition and a sharp stone was fired at the outer glass sheet and the fracture produced took the form of a single fracture line running up and down the sheet from the point of impact and extending as a number of fracture lines circumscribing the point of impact at a distance of 25 cm to 40 cm from that point. There was no deterioration of vision through the windscreen.

The windscreen was then laid horizontally in a supporting frame with the inner sheet uppermost, and a 10 kg weight head form was dropped on to the sheet, impacting at an effective speed of about 32 km/h. There was powdery fragmentation of the inner sheet in the immediate region of the impact and the size of the fragments of diced glass increased somewhat towards the edges of the windscreen. This powdery fragmentation of the inner sheet was accompanied by a shattering of the outer sheet, although the plastic interlayer did not break and was able to deform downwardly under the weight of the headform. This simulated the effect of a head striking the inner sheet resulting in shattering of both sheets of glass to permit deformation of the flexible interlayer which decelerates the head.

Another laminated windscreen was made from two sheets of glass 2 mm thick which had been thermally toughened to the extent that each sheet had a central tensile stress of about 475 kg/cm$^2$. When subjected to the same tests the fracture of the outer sheet by a sharp object resulted in a slightly more complicated fracture of the windscreen into relatively large particles, while the fracture of the inner sheet by the headform gave a more extensive area of powdery fragmentation, with increased facility for deformation of the shattered windscreen by the headform.

A further laminated windscreen incorporating two sheets of 2 mm glass thermally toughened to the extent that each sheet had a central tensile stress of 560 kg/cm$^2$, was made. The fracture of the outer sheet by a sharp stone had an appearance more closely akin to that usually associated with the release of stress in a thermally toughened sheet, in that large sized dicing of the glass resulted. Visibility through the windscreen was not severely impaired. An even greater area of powdery fragmentation of the inner sheet resulted from the test with the headform, very small fragments being present in the immediate area of impact.

Laminated windscreens comprising two sheets of toughened glass were made with other combinations of stress and thickness, for example a 2 mm inner sheet laminated with a 3 mm outer sheet. The thickness of either sheet could be in the range 0.5 mm to 3 mm, or a laminate with both sheets 3 mm thick, or a laminate with one sheet 1.5 mm thick and the other sheet either 2 mm or 3 mm thick. A commercial thickness often used for either sheet is 2.2 mm.

It was found that the range of central tensile stress for the inner sheet was 380 kg/cm$^2$ to 1120 kg/cm$^2$, and that for the outer sheet the range of central tensile stress should be 380 kg/cm$^2$ to 560 kg/cm$^2$. While stresses at the lower ends of these ranges are suitable, it was preferred to have a central tensile stress of at least 420 kg/cm$^2$ in either sheet.

It was also found that when the outer sheet of glass is an untoughened glass sheet, the thickness of the outer sheet may be as great as 3.5 mm and a greater degree of toughening of the inner sheet is sometimes desirable, up to the limit of about 1120 kg/cm$^2$ above which value tests have shown that the inner glass sheet is so strong as to require a bending force to shatter the sheet which is above that which the human head can reasonably tolerate.

In one example an inner sheet 1.5 mm thick and having a central tensile stress of 520 kg/cm$^2$ was laminated with an untoughened sheet 3.5 mm thick.

In another example a 2.2 mm sheet with a central tensile stress of about 800 kg/cm$^2$ was laminated with an untoughened sheet also 2.2 mm thick.

The present practice is to use a penetration-resistant interlayer of polyvinyl butyral which is 0.75 mm nominal thickness, in order to conform with the requirements of American National Institute Standard Z26.1 — 1966. However it is within the ambit of the invention to use other thicknesses of polyvinyl butyral which meet specific penetration requirements, and other suitable plastics interlayer materials, for example the ethylene copolymers described in U.S. Pat. No. 3,532,590, the interlayer being of whatever thickness is appropriate in the light of the properties of the particular material.

What is claimed is:

1. A laminated glass windscreen comprising:
    a thin, annealed, outer glass sheet of a thickness within the range 0.5 to 3.0 mm;
    a flexible, transparent, penetration-resistant interlayer of plastics material;
    a thin, inner glass sheet adhered to said outer glass sheet by means of said interlayer;
    said thin inner glass sheet being a sheet
    (a) of a thickness within the range 0.5 to 3.0 mm, and
    (b) which has been thermally toughened to provide a central tensile stress within the range of 380 kg/cm$^2$ to 560 kg/cm$^2$ and which in such that additional stress induced upon the bending of the windscreen by the impact of an object such as a human head with the thin, inner sheet causes powdery fragmentation of the inner glass sheet when it breaks.

2. A laminated glass windscreen comprising:
    a thin, annealed, outer glass sheet of a thickness within the range 0.5 to 3.0 mm;
    a flexible, transparent, penetration-resistant interlayer of plastics material;
    a thin, inner glass sheet adhered to said outer glass sheet by means of said interlayer;
    said thin inner glass sheet being a sheet
    (a) of a thickness within the range 0.5 to 3.0 mm, and
    (b) which has been thermally toughened to provide a central tensile stress within the range of 420 kg/cm$^2$ to 700 kg/cm$^2$ and which is such that additional stress induced upon the bending of the windscreen by the impact of an object such as a human head with the thin, inner sheet causes powdery fragmentation of the inner glass sheet when it breaks.

* * * * *